United States Patent [19]

Thiersch et al.

[11] Patent Number: 4,585,521
[45] Date of Patent: Apr. 29, 1986

[54] WASTE HEAT REMOVAL SYSTEM FOR REGENERATIVE COKE OVEN BATTERIES HAVING SIDE BURNERS

[75] Inventors: Friedrich Thiersch; Manfred Strobel; Heinz-Leo Dahlkamp, all of Recklinghausen, Fed. Rep. of Germany

[73] Assignee: Firma Carl Still GmbH & Co. KG, Fed. Rep. of Germany

[21] Appl. No.: 612,360

[22] Filed: May 21, 1984

[30] Foreign Application Priority Data

May 20, 1983 [DE] Fed. Rep. of Germany ....... 3318347

[51] Int. Cl.⁴ .............................................. C10B 5/12
[52] U.S. Cl. ..................................... 202/141; 202/146
[58] Field of Search ............... 202/138, 139, 140, 141, 202/142, 143, 146; 201/26, 41

[56] References Cited

U.S. PATENT DOCUMENTS

| | | | |
|---|---|---|---|
| 1,822,699 | 9/1931 | Hughes | 202/146 |
| 1,904,191 | 4/1933 | Becker | 202/143 |
| 2,220,919 | 11/1940 | Staeckel | 202/144 |
| 2,237,689 | 4/1941 | Puening | 202/146 |
| 3,183,175 | 5/1965 | Breitbach et al. | 202/141 |
| 3,560,348 | 2/1971 | Kulakov et al. | 202/139 |
| 3,935,078 | 1/1976 | Thiersch et al. | 202/141 |
| 4,216,060 | 8/1980 | Murata et al. | 202/146 |
| 4,256,540 | 3/1981 | Strobet et al. | 202/141 |
| 4,290,854 | 9/1981 | Strobel et al. | 201/26 |

FOREIGN PATENT DOCUMENTS 1671349 4/1974 Fed. Rep. of Germany.

Primary Examiner—Jay H. Woo
Assistant Examiner—Joye L. Woodard
Attorney, Agent, or Firm—McGlew and Tuttle

[57] ABSTRACT

A waste heat removal system for a regenerative coke oven battery which has side burners and a regenerator portion comprises a plurality of substantially parallel longitudinally extending channels of substantially equal cross section which are defined in the battery at spaced lateral locations and extend over substantially the entire length of the battery below the regenerator portion. A common transversely extending collecting duct adjacent one end of the battery is connected to each of the channels. A waste heat collection duct is disposed along at least one side of the channels and it is associated with a selective portion of the regenerator and a long cross channel is connected to the waste heat connection duct and to selected ones of the channels. The cross channels extend from the pusher side to the coke side or vice versa and form alternately short and long connections to corresponding longitudinal channels. The first cross channel at the side remote from the flue or chimney has a smaller passage opening leading into each of the longitudinal channels.

3 Claims, 5 Drawing Figures

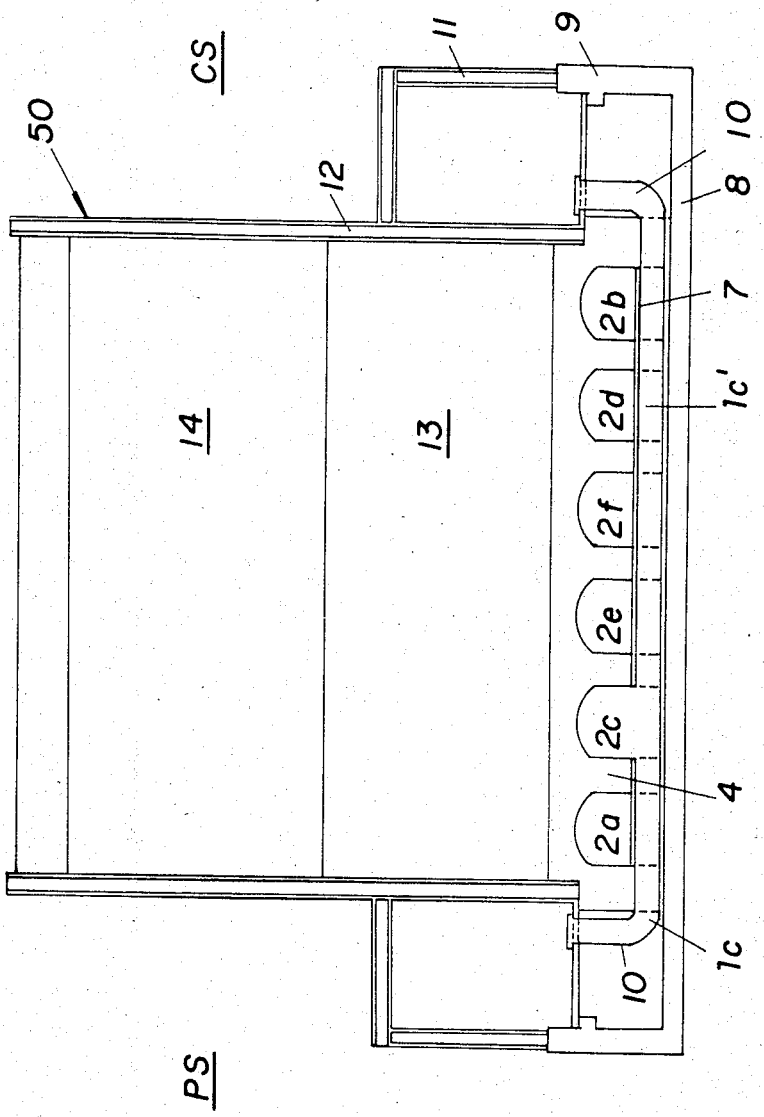

WASTE HEAT REMOVAL SYSTEM FOR REGENERATIVE COKE OVEN BATTERIES HAVING SIDE BURNERS

FIELD AND BACKGROUND OF THE INVENTION

This invention relates in general to coke ovens and in particular to a new and useful regenerative coke oven battery which has side burners and a regenerator section and to a waste heat removal system therefor.

A waste heat removal system is known from German Pat. No. 23 67 330 (U.S. Pat. No. 3,935,078) which provides that, during one phase of heating, the flue gases are directed from one side, for example the pusher side, of the battery successively into all of the flue gas channels extending beneath the battery. Upon reversal of the heating, the flue gases are directed into the channel again from the other side (the coke side).

In this prior art design, even though the cross sectional area of flow of all the flue channels is utilized simultaneously, a zone forms in the waste heat removal system at the pusher side or the coke side, in which no hot flue gases flow during one of the two heating periods. In this prior art structure, an inside lining of the concrete surfaces with insulating masonry must be used, since the still present temperature variations would cause peeling and damage to the unprotected concrete walls. The temperature variations are caused particularly by the fact that, due to an unsatisfactory sealing of the waste heat valve at the side where the cool fuel gases are introduced into the heating sytem, a portion of these cool gases is taken by suction into the flue gas channels.

Another waste heat removal system is known from German Pat. No. 16 71 349 according to which the entire space beneath the regenerators is designed for collecting the waste gases from both sides of the battery. Here again, the flue gas flows toward the chimney along an about diagonal path below the battery, so that the hot gases avoid almost one half of this space which is therefore considerably cooled during the reversal period.

SUMMARY OF THE INVENTION

The invention is directed to a waste heat removal system in which damaging temperature variations are eliminated in the entire structure including the flue gas channels, so that an insulating lining for the channel walls which are made of concrete, can be omitted.

In accordance with the invention a waste heat removal system for a regenerative coke oven battery which has side burners and a regenerative portion comprises a plurality of substantially parallel longitudinally extending channels of substantially equal cross section defined in the battery at spaced lateral locations and extending substantially the entire length of the battery below the regenerative portion. A common transversely extending collecting duct is located adjacent an end of the battery and connected to each of the channels. In addition, a waste heat connection duct is disposed along at least one side of the channels and associated with a selected portion of the regenerator. A long cross channel is connected to each of the waste heat connections and to selected ones of the channels and has openings to the channels of varying flow areas.

The inventive system makes sure that, with the exception of some of the support for the oven, the hot flue gases are forced to always flow along all the supporting elements or parts of the oven. This guarantees a constant uniform heating of the structure including the flue gas channels, and of the base plate of the battery. Within the channels, the temperature variations are reduced by the inventive waste heat removal system to a minimum, so that the hitherto necessary inner lining of the channels with refractory or similar insulating materials can be omitted. The costs of construction of a coke oven battery are thereby considerably lowered. Advantageously the regenerator is connected so that at the battery end remote from the collecting duct or waste heat connection at the pusher side, for example, which is associated with a first regenerator, is connected through a long cross channel with a first longitudinal channel extending close to the outside on the pusher side. The opposite waste heat connection at the coke side is associated with a first regenerator portion and is connected through a long cross channel to the same longitudinal channel at the pusher side. The waste heat bend at the pusher side associated with the second regenerator is connected through a long cross channel and the waste heat connection or duct at the coke side associated with the second regenerator is connected through a short cross channel to the longitudinal channel extending closest to the outside of the coke side.

Advantageously the cross channels associated with the first two and preferably the first one of the regenerators of the entire battery are provided with small passage openings of uniform or stepped size to all of the longitudinally extending channels and the passage to the outer longitudinal channel is correspondingly reduced. This makes it possible to direct the flow around the concrete supports marked by an x in FIGS. 1 and 2. Since the amount of flue gases to be removed from the regenerator at the end of the battery is smaller than that from the normal regenerators, the pressure loss in these regenerators is smaller, and additional pressure losses occurring at the passages from the cross channels into the longitudinal channel may be tolerated. This distribution of the flue gases from the first regenerator into all the longitudinal channels ensures that from the beginning, a certain minimum amount of hot flue gases will flow through all the longitudinal channels. This means that during the entire heating time, the few concrete supports marked by an x in FIGS. 1 and 2 will not be exposed to undue temperature variations.

It has proved particularly advantageous to combine the arrangement of the waste heat channels with waste heat valves which, in a manner known per se, comprise a water seal. As compared to conventional dry seals, the water seal provides a considerably better sealing of the waste heat channels, which are under constant negative pressure, relative to the gases introduced for combustion. Practically no cool gases can penetrate through the waste heat valves comprising water seals. Due to the thus reduced amount of air or mixed gas infiltrated into the waste heat system, the waste heat loss and, consequently, the heat consumption of the coke oven battery is reduced.

Accordingly, it is an object of the invention to provide an improved waste heat removal system for a regenerative coke oven.

A further object of the invention is to provide a regenerative coke oven which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its use, reference is made to the accompanying drawings and descriptive matter in which preferred embodiments of the invention are illustrated.

BRIEF DESCRIPTION OF THE DRAWINGS

FIG. 5 is a cross sectional view parallel to that of FIG. 4, taken through the cross channel 1c and 1c'.

DESCRIPTION OF THE PREFERRED EMBODIMENTS

Figure 1:
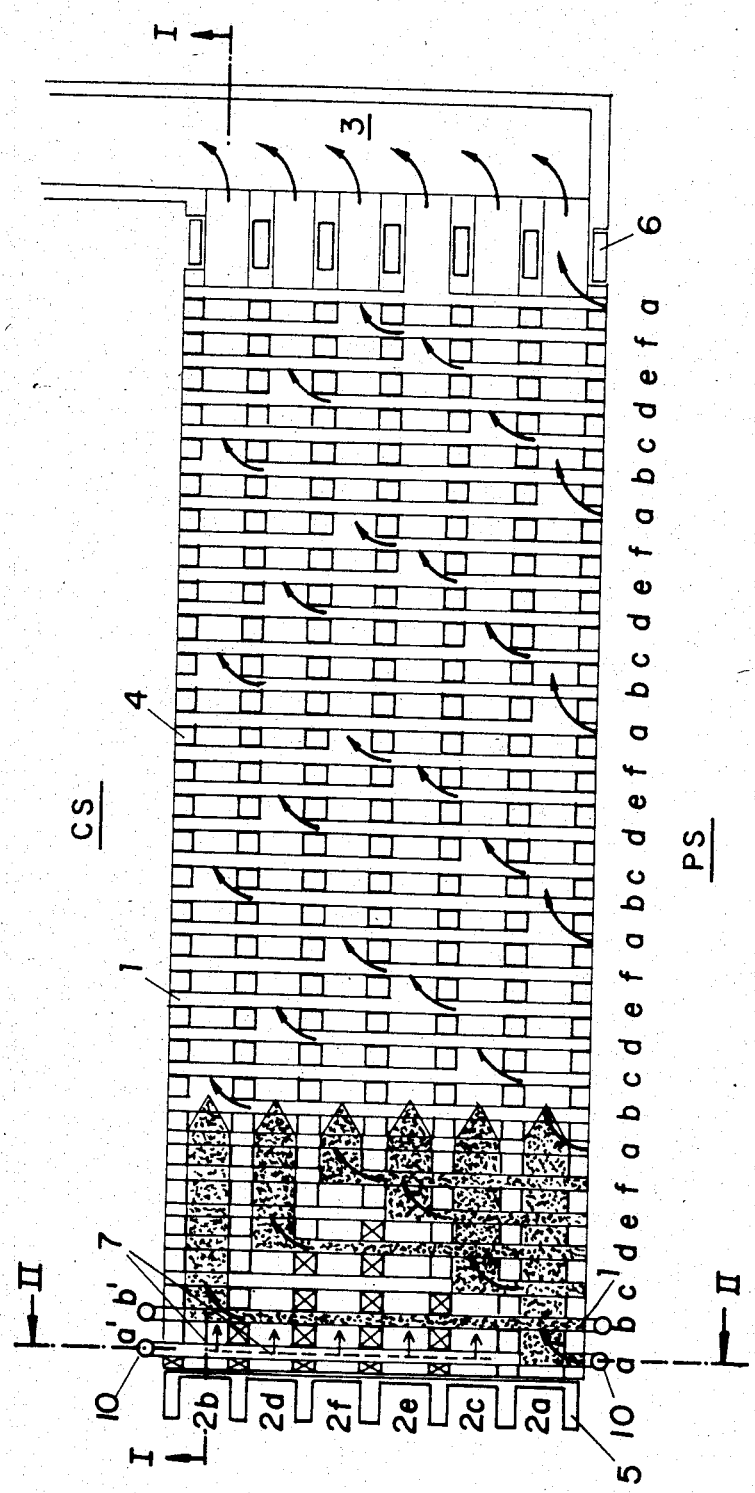
FIGS. 1 and 2 are plan views of an inventive waste heat removal system, with FIG. 1 having arrows indicating the paths followed by the waste heat from the pusher side, and FIG. 2 showing the paths from the coke side of the battery.
Figure 2:
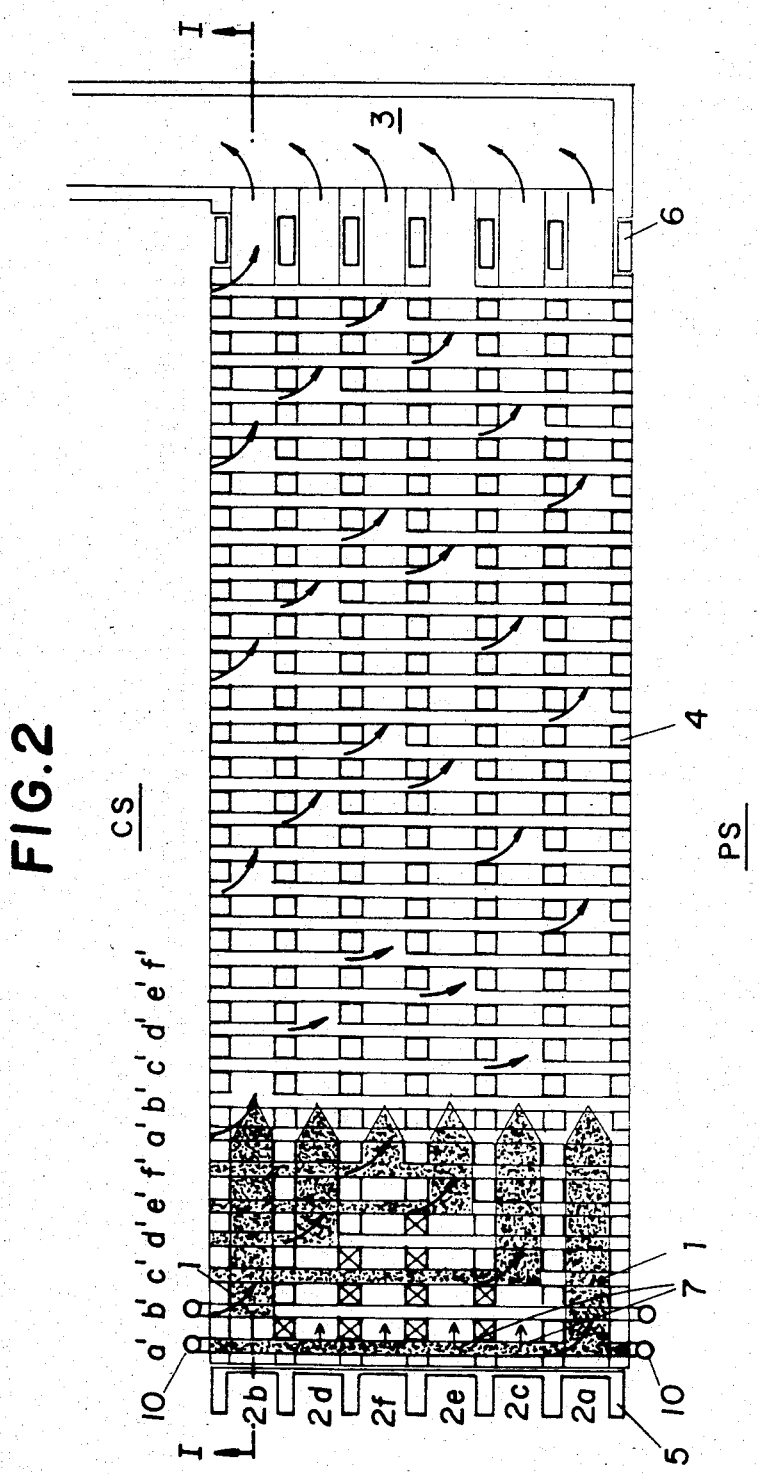
Figure 4:
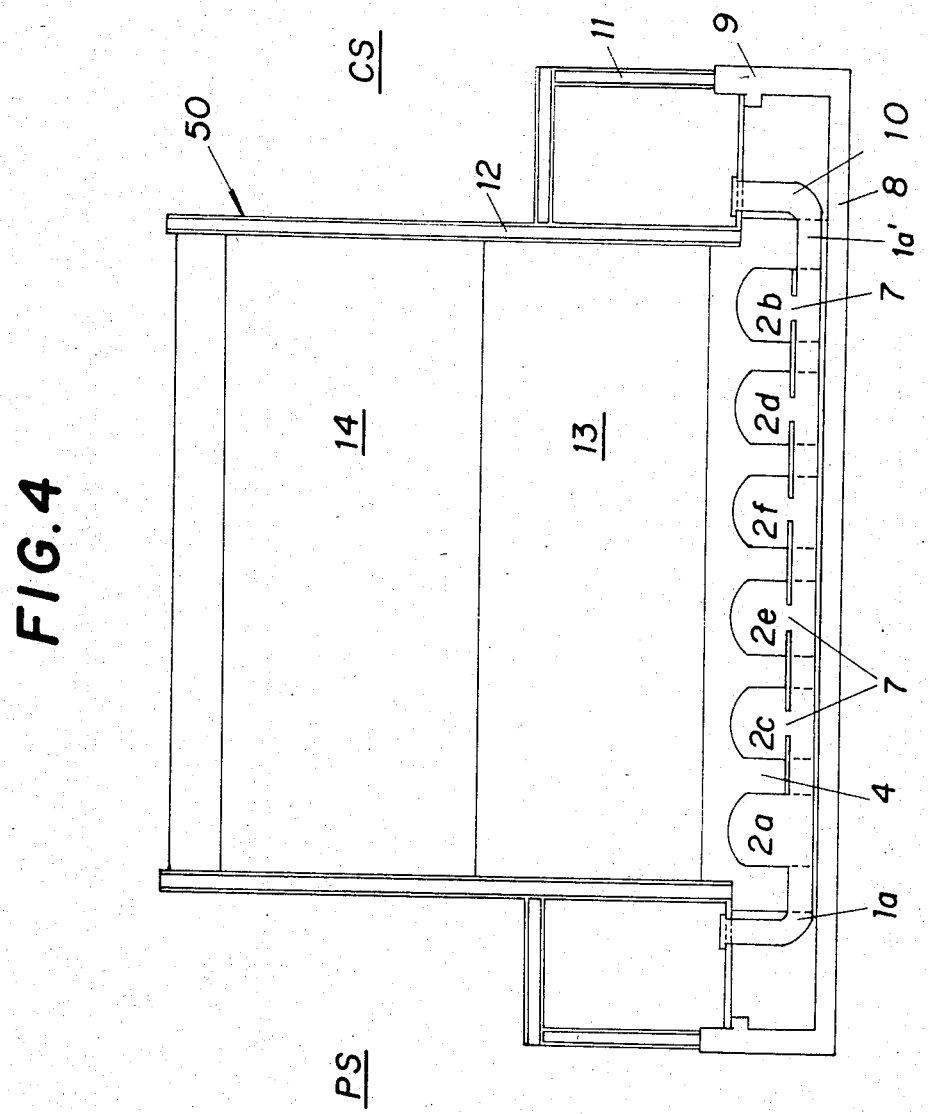
FIG. 4 is a cross sectional view taken along the line II—II of FIG. 1.

Referring to the drawings in particular, the invention is embodied therein as best shown in FIG. 4 and includes a waste heat removal system for a regenerative coke oven battery generally designated 50 which includes a coke side designated CS and a pusher side designated PS. The coke oven 50 includes a heating wall 14 and a regenerator portion 13 which are both bounded by anchor supports 12. The coke oven battery has side burners (not shown) in addition to the regenerative portion 13. The waste heat system comprises a plurality of substantially parallel longitudinally extending channels 2a, 2b, 2c, 2e, 2d and 2f which are of substantial equal cross section and arranged at spaced locations and extend over substantially the entire length of the battery below the regenerative portion 13. A common transversely extending collecting duct 3 as shown in FIGS. 1 and 2 is located adjacent an end of the battery and is connected to each of the channels 2a, 2b, etc. The waste heat connection 10 having appropriate pipe ends and associated valves is disposed along each side of the channels 2a, 2b, etc. The valves are associated with a separate part of the regenerative portion 13. A long cross channel 1a, 1b, 1c, 1d, etc. is connected to each waste heat connection 10.

The waste heat removal system provided below the regenerators 13 and the coke ovens 14 may best be learned from FIGS. 1 and 4. These figures show the longitudinal channels 2a to 2f extending the entire length of the coke oven battery and uniformly distributed across the width of the foundation of the battery. These longitudinal channels 2a to 2f communicate through cross channels 1a to 1f or 1a' to 1f' with waste heat bends 10a, 10a' to 10f, 10f' which are provided at both the pusher side PS and the coke side CS of the battery. The cross channels 1a, a' to 1f, f' extend beneath the longitudinal channels 2a to 2f directly on the foundation plate 8. Foundation plate 8 carries support walls 9 which support a service passage wall 11. FIG. 4 further shows passage openings 7 which, however, are provided only for the first cross channel 1a, 1a', or the first two at most, to permit the waste gases to flow from the cross channel vertically up into each of the longitudinal channels 2a, 2c, 2e, 2f and 2d. The channel 2a has a larger cross-section opening to the channel 1a, 1a'.

FIGS. 1 and 2 illustrate the entire waste heat removal system extending below the coke oven battery, between the concrete anchor supports 4 and the heads 5 and 6 of the battery. The shaded arrows indicate the flow of the waste gases and make clear the structure of the inventive system. According to FIG. 1, the waste gases flow from a regenerator 13 at the pusher side PS through waste heat valves 10 into cross channels 1a to 1f and therefrom into longitudinal channels 2a to 2f to be united at the smoke stack end of the battery in a collecting duct 3 leading through a chimney flue into the stack. Waste heat valve 10a is connected to longitudinal channel 2a through short cross channel 1a. The next waste heat valve 10b is connected to longitudinal channel 2b through long cross channel 1b. A waste heat valve 10c is connected to the second longitudinal channel 2c, considered from the pusher side, through short channel 1c. A waste heat valve 10d is connected to second longitudinal channel 2d considered in the coke side, through cross channel 1d and the two waste heat valves 10e and 10f are connected to the two longitudinal channels 2e and 2f in the middle through cross channels 1e and 1f, respectively. Then, this sequence recurs in a number of periodical arrangements corresponding to the number of regenerators or waste heat valves provided in a coke oven battery.

In FIG. 2, the flow of waste gases is shown coming from the coke side. This flow is symmetrical to that shown in FIG. 1. Both FIG. 1 and FIG. 2 further show passage openings 7.

Figure 3:
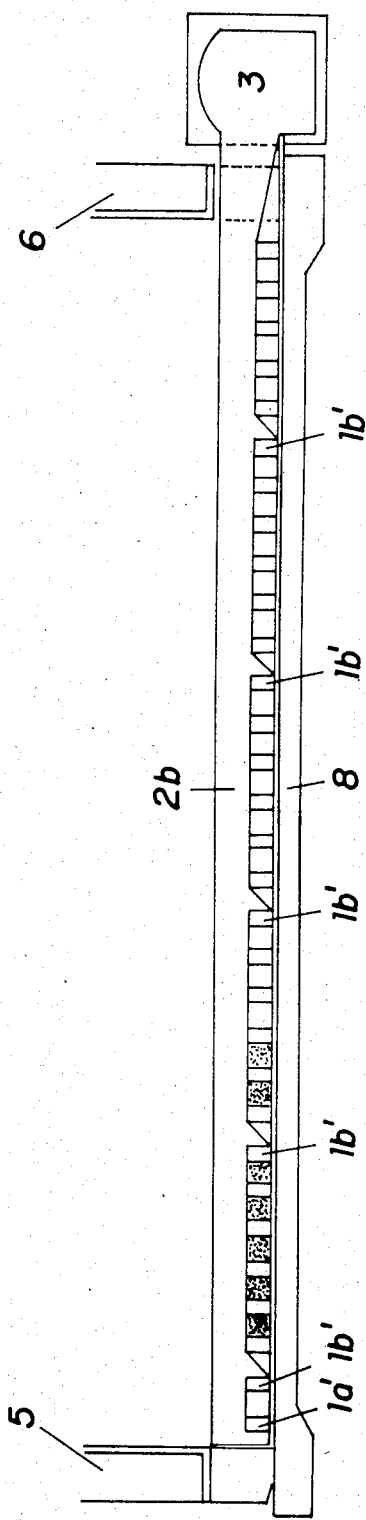
FIG. 3 is a longitudinal sectional view taken along the line I—I of FIGS. 1 and 2.

Only for reasons of clarity, respective shaded arrows are omitted. The arrows extend in longitudinal channels 2c to 2f right from the first cross channel. In FIG. 3, the substructure of the battery is shown in a longitudinal sectional view through the first longitudinal channel at the coke side. The intermediate spaces between cross channels 1a, 1a' to 1f, 1f' are filled out with material. The longitudinal channels 2a to 2f extend above the cross channels. The transition passage from a cross channel to a longitudinal channel slopes upwardly in the area between two cross channels. In FIG. 3, these sloping passages are shown leading into longitudinal channel 2b after every sixth cross channel, i.e. downstream of channels 1b or 1b'.

FIG. 5 shows how the two cross channels 1c and 1c', for example, are associated with the respective longitudinal channel 2c. In the area where the cross channels 1c or 1c' open into the longitudinal channel 2c, the entire width of longitidunal channel is available for the waste gas flow.

According to the invention thus the cross channels 1 comprise a series of cross channels for each regenerator 13. Each series consists of a first long cross channel communicating with a longitudinal channel immediately next to the pusher side through an opening, a second cross channel communicating with a longitudinal channel closest to the coke side through an opening, a third cross channel communicating with a longitudinal channel spaced one longitudinal channel away from the pusher side through an opening, and a fourth cross channel communicating with a longitudinal channel one channel away from the coke side through an opening, the communications between the series of long cross channels and longitudinal channels progressing for each of the regenerators in a direction toward the collecting duct, progressively inwardly away from the pusher side and coke side respectively. The first cross channel of each series also communicates to each of the other longitudinal channels through openings, the first cross channel communicating with the longitudinal channel closest to the pusher side through a larger opening than communication between the first cross channel and the remaining longitudinal channels.

While specific embodiments of the invention have been shown and described in detail to illustrate the application of the principles of the invention, it will be understood that the invention may be embodied otherwise without departing from such principles.

What is claimed is:

1. A waste heat removal system for a regenerative coke oven battery having side burners and a plurality of regenerators, the coke oven battery having a pusher side and an opposite coke side both lying on longitudinal sides of the coke oven battery, said coke oven battery also having opposite longitudinal ends, the waste heat removal system comprising:

a plurality of parallel laterally spaced longitudinal channels of substantially equal cross-section defined in said battery at spaced lateral locations between said coke side and said pusher side, said longitudinal channels extending over substantially the entire length of the battery below the plurality of regenerators;

a common transversely extending waste heat collecting duct adjacent one longitudinal end of the battery and connected to each of said longitudinal channels;

a waste heat connection at each of said pusher and coke sides of said battery, each waste heat connection being connected to each of said plurality of regenerators;

a plurality of long cross channels extending between and connected to said waste heat connections at said pusher and coke side of the battery, said cross channels being below said longitudinal channels; and starting from an opposite longitudinal end of the battery opposite from said waste heat collecting duct, each regenerator including a series of long cross channels, each series consisting of a first long cross channel communicating with a longitudinal channel immediately next to said pusher side through an opening, a second cross channel communicating with a longitudinal channel closest to said coke side through an opening, a third cross channel communicating with a longitudinal channel spaced one longitudinal channel away from said pusher side through an opening, a fourth cross channel communicating with a longitudinal channel one channel away from said coke side through an opening, and at least one more cross channel spaced from said fourth cross channel in the direction of said waste heat collecting duct, communicating with one more longitudinal channel through an opening, the communications between said series of long cross channels and said longitudinal channels progressing for each of said regenerators in a direction toward said waste heat collecting duct progressing inwardly away from said pusher side and said coke side respectively.

2. A waste heat removal system according to claim 1, wherein said first cross channel of each series communicates with each of said longitudinal channels through openings, communication between said first cross channel and said longitudinal channel closest to said pusher side being through a larger opening than communication between said first cross channel and the remaining longitudinal channels.

3. A waste heat removal system according to claim 2, including a water seal for each of said waste heat connections for sealing communication between said waste heat connection and said cross channels.

* * * * *